(12) United States Patent
Cloonan et al.

(10) Patent No.: US 6,449,249 B1
(45) Date of Patent: Sep. 10, 2002

(54) SPARE CIRCUIT SWITCHING

(75) Inventors: Thomas J. Cloonan, Lisle; Daniel W. Hickey; Ubaldo Cepeda, both of Oswego; Gerald P. Ryan, Lake Zurich, all of IL (US)

(73) Assignee: Arris International, Inc., Duluth, GA (US)

( * ) Notice: Subject to any disclaimer, the term of this patent is extended or adjusted under 35 U.S.C. 154(b) by 61 days.

(21) Appl. No.: 09/656,940

(22) Filed: Sep. 7, 2000

(51) Int. Cl.[7] .......................... H04L 12/26; H04L 1/22; H04J 3/14; G08B 21/00; H04B 1/74

(52) U.S. Cl. ..................... 370/217; 370/220; 370/228; 340/825.01; 340/651; 714/4; 714/43

(58) Field of Search ............................. 370/217, 218, 370/228, 220, 219, 237, 354; 340/825.01, 825.03, 825.16, 826, 827; 714/4, 11, 13

(56) References Cited

U.S. PATENT DOCUMENTS

| | | | | |
|---|---|---|---|---|
| 4,700,340 A | * | 10/1987 | Beranek et al. | ............. 370/218 |
| 5,146,452 A | * | 9/1992 | Pekarske | .................... 370/228 |
| 5,311,551 A | * | 5/1994 | Eng | ........................... 375/260 |
| 5,321,393 A | * | 6/1994 | Carlton et al. | ......... 340/825.01 |
| 5,321,394 A | * | 6/1994 | Carlton et al. | ......... 340/825.01 |
| 5,627,837 A | * | 5/1997 | Gillett | ........................ 371/5.5 |
| 5,901,024 A | * | 5/1999 | Deschaine et al. | ............. 361/67 |
| 5,953,313 A | * | 9/1999 | Aso et al. | .................... 370/220 |
| 6,202,170 B1 | * | 3/2001 | Busschbach et al. | .......... 714/11 |

* cited by examiner

*Primary Examiner*—Wellington Chin
*Assistant Examiner*—M. Phan
(74) *Attorney, Agent, or Firm*—Vedder. Price, Kaufman & Kammholz

(57) ABSTRACT

Active and spare circuit cards are each paired with switch cards. Each switch on the switch cards is daisy chained with prior and succeeding switches. A master controller senses a faulty circuit indication signal from each of the active circuit cards. When the faulty circuit indication signal indicates a fault on a particular active circuit card, the controller instructs the switch card that is paired with that circuit card to switch it out and switch in a spare circuit card.

8 Claims, 7 Drawing Sheets

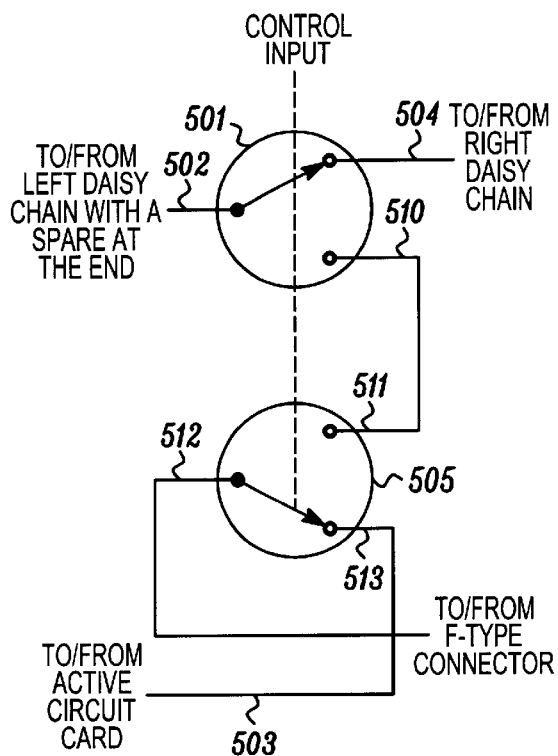
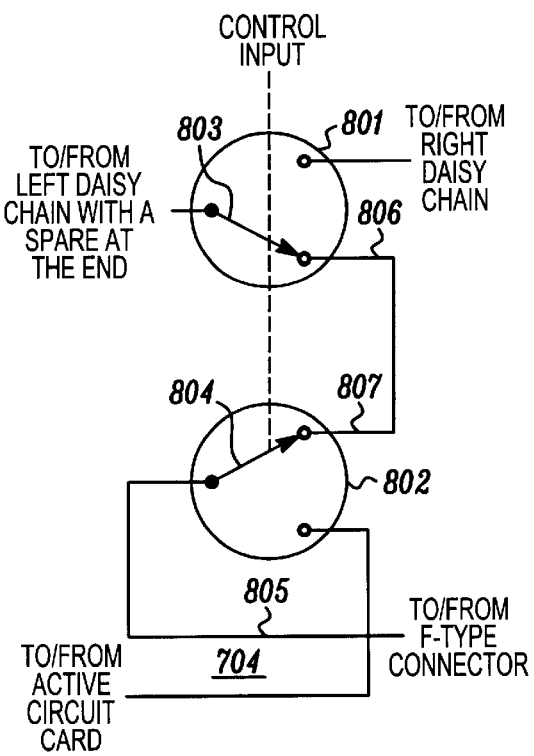
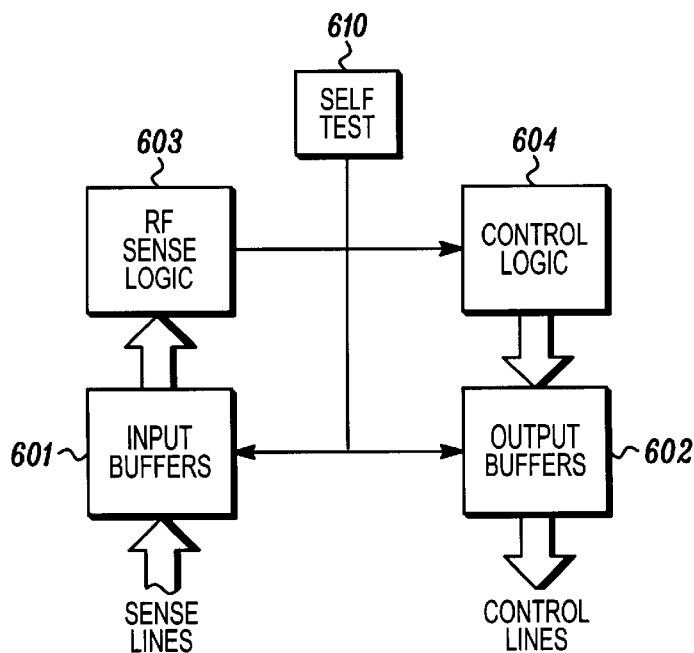

SPARE CIRCUIT SWITCHING

FIELD OF THE INVENTION

The present invention relates generally to switching of spare circuits. Particularly, the present invention relates to spare circuit control in a cable modem environment.

DESCRIPTION OF THE RELATED ART

In order to provide more products to their subscriber base, cable television companies are offering access to the Internet through their cable modem (CM) boxes. The benefits in using the cable companies instead of a dial-up Internet Service Provider is multiple services under one bill, always-on access, and, in some cases, higher speed access.

In order to provide their customer's with Internet access, the cable companies use some of the 50–800 MHz spectrum typically set aside for their television channels to provide the bandwidth required for the data transfers. A typical cable system has the bandwidth to provide 100 television channels to its subscribers. Each NTSC television signal requires 6 MHz of bandwidth.

In order for a cable subscriber to access the Internet through their cable television provider, the subscriber must have a CM. The CM is similar to the Cable Modem Termination System (CMTS) equipment required at the cable company's headquarters, except for the greater size required at the headquarters. This is to accommodate a greater number of signals than is required by the home modem.

The home CM box and the CMTS use well-known Ethernet frames to communicate between them. The cable system, however, uses a different modulation scheme, Quadrature Amplitude Modulation (QAM), than is normally used in an Ethernet scheme.

Using QAM, the downstream (from the cable company equipment to the home CM) data rate is in the range of 30–40 Mbps for each 6 MHz channel. This can typically accommodate between 500 and 2000 subscribers. The more subscribers that the cable company tries to fit in that spectrum, however, the data rate provided to each subscriber must be reduced.

The upstream data flow is different and more complex. In the past, cable companies did not have to worry about providing bandwidth for the customer to communicate in the upstream direction. Pay-per-view programming such as movies and sports events, however, required this ability. The cable companies, therefore, set aside the 5–42 MHz spectrum to allow the home CM to communicate in the upstream direction. The cable companies now use this 5–42 MHz spectrum to provide the necessary upstream access to the Internet from the home CM.

Cable companies, as well as other Internet Service Providers, are currently introducing Quality of Service (QoS) to Internet access. The current Internet routing model of "best effort" service now provided to all users, packets, and traffic flows is being replaced with services that differentiate between packets.

FIG. 1 illustrates a typical prior art CMTS block diagram. The CMTS typically is comprised of a cable interface card (101) to provide the interface signals and modulation to the signals transmitted to the home modem. An Ethernet card (110) interfaces the CMTS to the Internet by providing appropriate timing, control, and data signal formats for the Internet. A buffer circuit (105) between the cable interface card (101) and Ethernet card (110) stores data in both the upstream and downstream directions when the processing in either the cable interface card or the Ethernet card is slower than the incoming data.

FIG. 2 illustrates a typical prior art circuit card layout of a CMTS. This CMTS is comprised of a number of cable interface cards (201–205) connected to a mid-plane (210). Each cable interface card (201–205) has an associated switch card (211–215). Each cable interface card is associated with a number of cable customers.

When one of the cable interface cards fails, those customers lose service until the failed card is manually swapped out for a good one. There is a resulting unforeseen need for a more reliable cable interface system to provide an economical back up to the cable interface cards.

SUMMARY OF THE INVENTION

The present invention encompasses a cable interface circuit back-up using spare cable interface circuit cards in conjunction with a switching scheme. The system of the present invention is comprised of a spare cable interface card assigned to a predetermined number of cable interface cards. In the preferred embodiment, a first spare cable interface card is assigned to two operating cable interface cards and a second spare cable interface card is assigned to one operating cable interface card.

The system of the present invention provides multiple spare circuit availability to multiple active circuits. The system is comprised of a plurality of active circuit cards, each active circuit card having circuitry that provides an output signal and that accepts an input signal.

The spare circuit card that is assigned to the N active circuit cards is comprised of circuitry that is substantially similar to the circuitry in the N active circuit cards. This spare circuit card acts as a back-up upon failure of one of the assigned active circuit cards.

The system further comprises a plurality of switching cards. Each switching card of the plurality of switching cards is paired with an active circuit card or a spare circuit card. Each switching card that is associated with an active circuit card also comprises an output for outputting a signal and an input for accepting a signal.

A controller circuit is coupled to each of the active circuit cards, each of the spare circuit cards, and each of the switching cards. The controller card provides a switch control signal to the switch card that is paired with a particular active circuit card when the behavior of that particular active circuit card becomes suspicious, indicating a failed active circuit card.

BRIEF DESCRIPTION OF THE DRAWINGS

FIG. 5 shows a preferred embodiment of a 2×2 switch in accordance with the RF protection switch system of FIG. 3.

FIG. 6 shows a block diagram of a master controller in accordance with the present invention.

FIG. 8 shows a 2×2 switch that has been switched in accordance with FIG. 7.

DETAILED DESCRIPTION OF THE PREFERRED EMBODIMENT

The present invention provides reliable and economical redundancy for cable interface circuit. By rapidly switching a spare cable interface circuit card into the place of a failed cable interface circuit card, a customer's service can be restored quickly, providing more reliable service.

Figure 1:
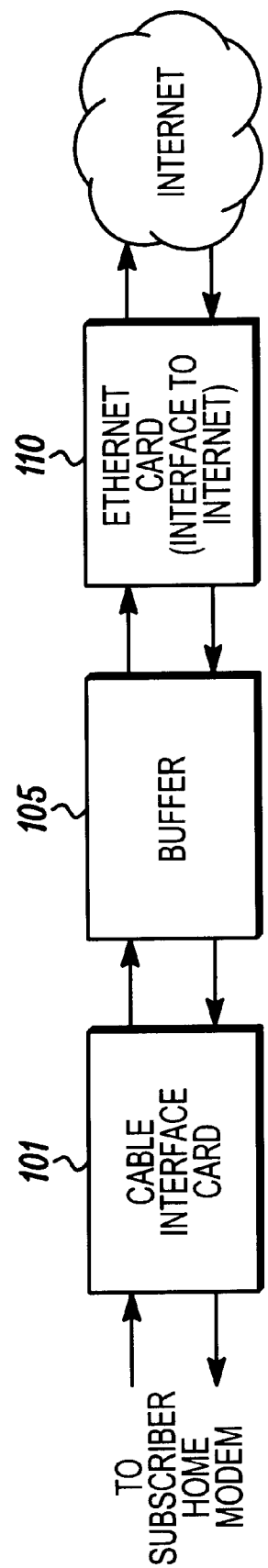
FIG. 1 shows a block diagram of a typical prior art cable modem termination system.
Figure 2:
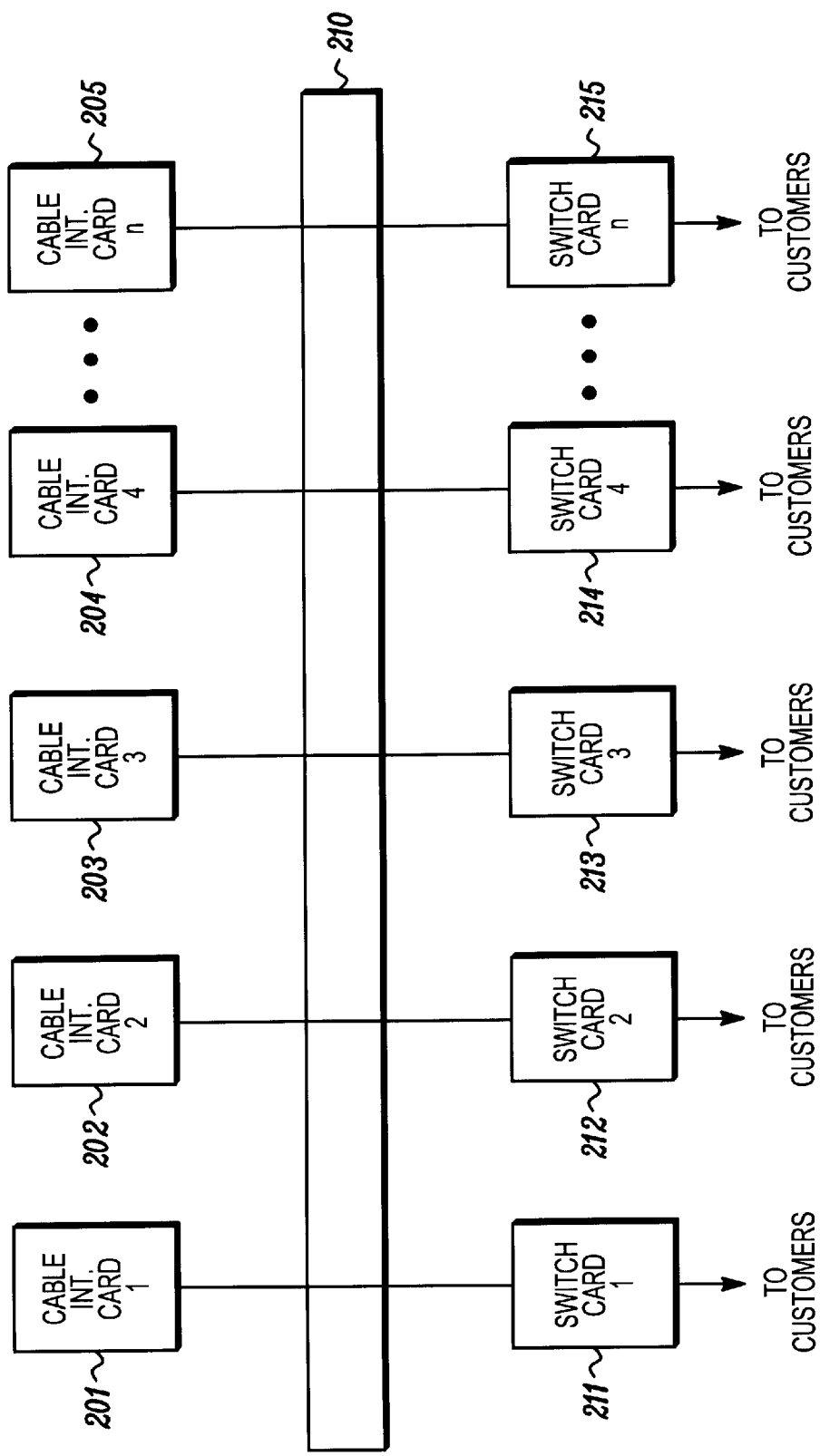
FIG. 2 shows a block diagram of a typical prior art card layout of cable interface cards and RF switches.
Figure 3:
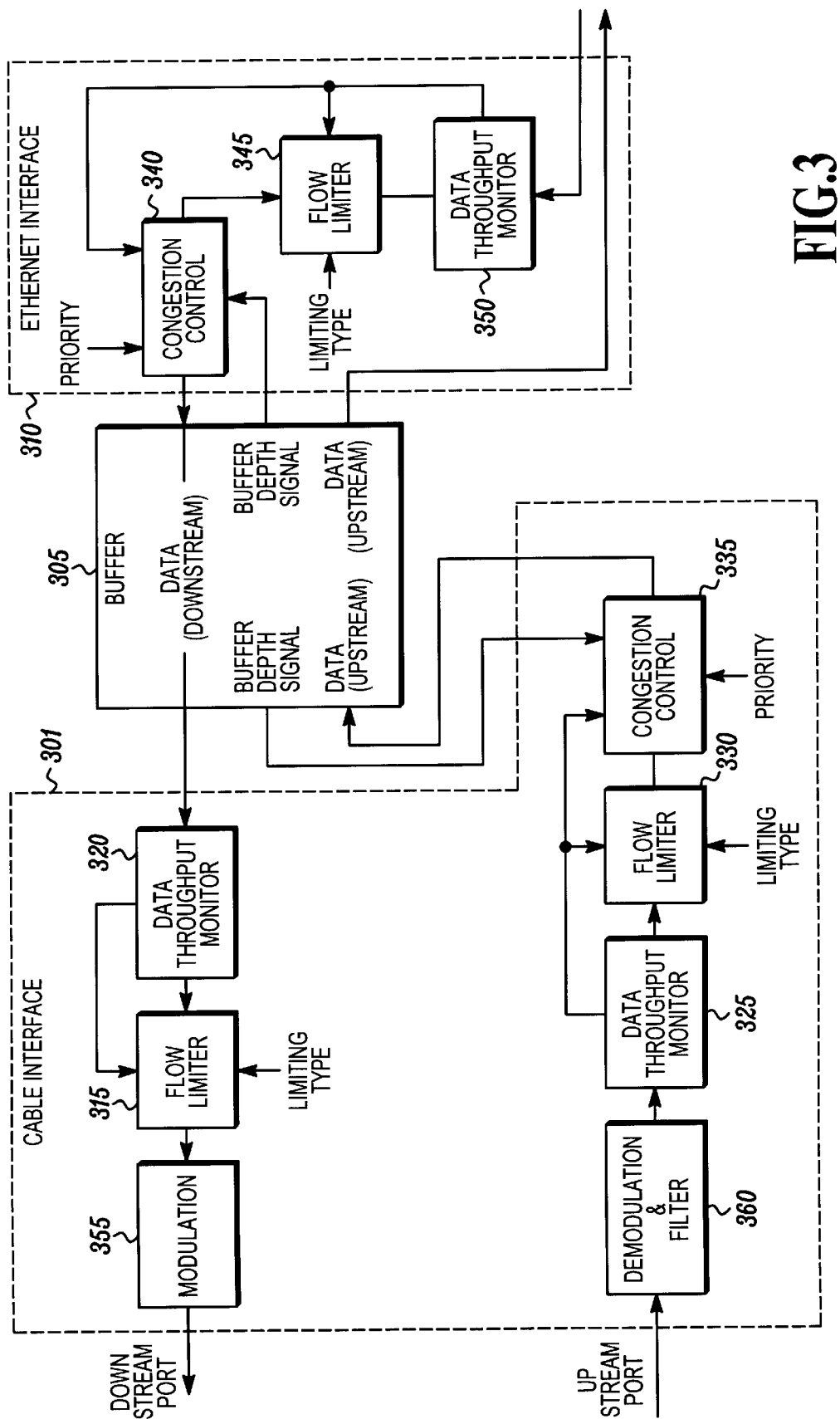
FIG. 3 shows a block diagram of the cable modem termination system apparatus of the present invention.

FIG. 3 illustrates the preferred embodiment cable modem termination system (CMTS) apparatus of the present invention. The CMTS apparatus is comprised of a cable interface (301) that is coupled to a buffer circuit (305). The buffer circuit (305) is coupled to an Ethernet interface (310). In the preferred embodiment, each of the individual circuits (301, 305, and 310) resides physically on separate circuit boards. In alternate embodiments, any circuits having substantially the same function can reside on one circuit board or even one integrated circuit. In other words, the present invention is not limited to three separate circuit boards.

The cable interface (301) is responsible for interfacing the CMTS to the home cable modem apparatus. The cable interface (301) also provides the functions of modulation and demodulation.

The cable interface circuit is comprised of a downstream packet flow path and an upstream packet flow path. The downstream packet flow path is comprised of a data throughput monitor (320) that is coupled to a flow limiter (315). The data throughput monitor (320) has an input that is coupled to the buffer circuit (305) from which the data packets flow and a feedback from the upstream path. The feedback from the upstream path is to allow a first CM to talk with other CMs. The data throughput monitor (320) has the task of determining the rate of data packet flow.

In the preferred embodiment of the CMTS, the downstream data packet flow rate is typically either 30 or 40 Mbps for each 6 MHz channel, using QAM techniques. Alternate embodiments use other flow rates. The cable company decides which data packet flow rate depending on the outcome desired by the company. The lower data rate is less susceptible to noise while the higher data rate can include more data per unit of time for the customers.

The data packet flow rate signal is fed into the flow limiter (315). This signal controls the flow limiter function. If the flow is greater than a predetermined level, $T_{max}$, the data packet flow can be limited. The flow limiter (315) reduces the data rate by dropping packets until the flow is reduced to below $T_{max}$.

Another input to the flow limiter (315) is the "limiting type" input. This control input is set by the cable company depending on how strict they wish a customer to adhere to the rules. If the "limiting type" input is set to "soft-limiting", the flow limiter (315) allows the data rate to go above the set data rate by a predetermined amount without dropping any packets.

Some cable companies may strictly limit a customer to $T_{max}$. In this case, the "limiting type" control input is set to "hard-limiting". If the data rate goes over the set hard limit, the flow limiter (315) drops any packets that force the customer to exceed $T_{max}$. The output of the flow limiter (315) is coupled to the cable that runs to the customers' cable modems.

The output of the flow limiter (315) is input to the modulator (355). This block (355) performs the QAM modulation needed to transmit the data to the CMs.

The upstream data path is comprised of a demodulator and filter (360) that converts the QAM signal into data bits in order to be processed by the other blocks in the upstream path. The demodulated data bits are input to a data throughput monitor (325) that is coupled to the upstream port from the customer's CM. This data throughput monitor (325) has the same functionality as the downstream monitor (320) of monitoring the data rate but in the upstream direction to the Internet.

In the preferred embodiment, the upstream data rate can be in the range of 320 kb to 10.24 Mbps. Alternate embodiment use other rates.

The upstream data throughput monitor (325) is coupled to a flow limiter (330). This flow limiter has similar functionality to the flow limiter (315) in the downstream path. The upstream path flow limiter (330) has the data rate input from the data throughput monitor (325) as well as the "limiting type" control input that, in the preferred embodiment, is set to either "hard-limiting" or "soft-limiting" depending on the cable company rules. As in the downstream flow limiter (315), the upstream flow limiter, depending on the "limiting type" input, drops all packets that force the customer to exceed $T_{max}$.

The upstream path further comprises a congestion control block (335) that is coupled to the upstream data path out of the flow limiter (330). The data packets from the upstream data path flow through the congestion control block (335) to the buffer circuit (305). The function of the congestion control block (335) is to drop packets when the buffer depth is reaching a maximum point. By dropping the packets before they reach the buffer, the buffer will not overflow.

In order to accomplish the task of congestion control, the congestion control block (335) has control inputs that are used to determine when to drop packets and which packets to drop. In the preferred embodiment, these control inputs include the data rate signal from the upstream data throughput monitor (325), a buffer depth signal from the buffer (305), and a priority signal.

The data rate signal from the upstream data throughput monitor (325), as described above, quantizes the data rate and feeds that value to the congestion control block (335). The buffer circuit depth signal from the buffer circuit (305) instructs the congestion control block (335) as to the depth of the buffer. In other words, if the buffer (305) is 75% full, the buffer depth signal instructs the congestion control block (335) of this.

The priority signal that is input to the congestion control block (335) informs the congestion control of the priority of each packet. This is important in determining which packets to drop.

A group of packets is assigned a priority based on the customer's level of service plan. If the customer has signed up for the basic service plan and paid the smallest fee for the most basic service, his packets are assigned a low priority. This priority is embedded in a packet identification that is assigned to the group of packets and is decoded when the group of packets enters the cable interface.

If the customer has signed up for the premium service plan with the cable company, his packets are assigned the highest priority. If the customer has signed up for any service plans that are in between the premium and the basic plans, this priority is also assigned to each packet. As described before, the priority is added to the packet identification for a particular group of packets.

A customer may also decide to dynamically change his service level for a given session. In this case, different packet groups from that particular customer will have different priorities assigned to different packet identifications.

As described subsequently in other figures, the congestion control block (335) of FIG. 3 uses the priority assigned to a group of packets to determine how to process that particular group of packets. The output of the congestion control block (335) is input to the buffer circuit's upstream data flow input.

The buffer circuit (305) stores the packets until the Ethernet circuit (310) has time to process that packet. The packets are fed from the buffer circuit (305) to the Ethernet circuit (310) as more processing time is freed up.

The downstream path of the Ethernet circuit (310) is comprised of a data throughput monitor (350) that is coupled to the connection to the Internet. This monitor (350) provides substantially the same function as the previously described data throughput monitors on both the upstream and downstream paths.

The data packets from the Internet flow from the data throughput monitor (350) to the Ethernet's circuit flow limiter (345). This flow limiter (345) has substantially the same functionality as the above described flow limiters. This flow limiter also has the same inputs as described previously: the quantized data rate and the "limiting type" control input.

The data packets flow from the flow limiter (345) to the congestion control block (340). As in the upstream congestion control block (335), the Ethernet's downstream congestion control block (340) has the three control inputs to determine which packets to drop: the quantized data rate, the buffer depth signal, and the packet priority signal. The congestion control block then drops a particular packet based on these control signals.

The downstream data flows from the congestion control block to the buffer circuit (305). The buffer circuit (305) stores the packets until the cable interface circuit has the processing time to work on additional packets.

The buffer circuit (305) is comprised of 128 MB of RAM in the preferred embodiment. Alternate embodiments use other values of RAM or even other types of memory instead of RAM. The alternate types of memory include hard drives or other types of temporary memory.

Most of the functions illustrated in FIG. 3 may be implemented in various ways. These functions can be performed in software by a processor or multiple processors performing each function. Each function can also be implemented in discrete logic hardware, a digital signal processor, or some other form of programmable logic.

Figure 4:
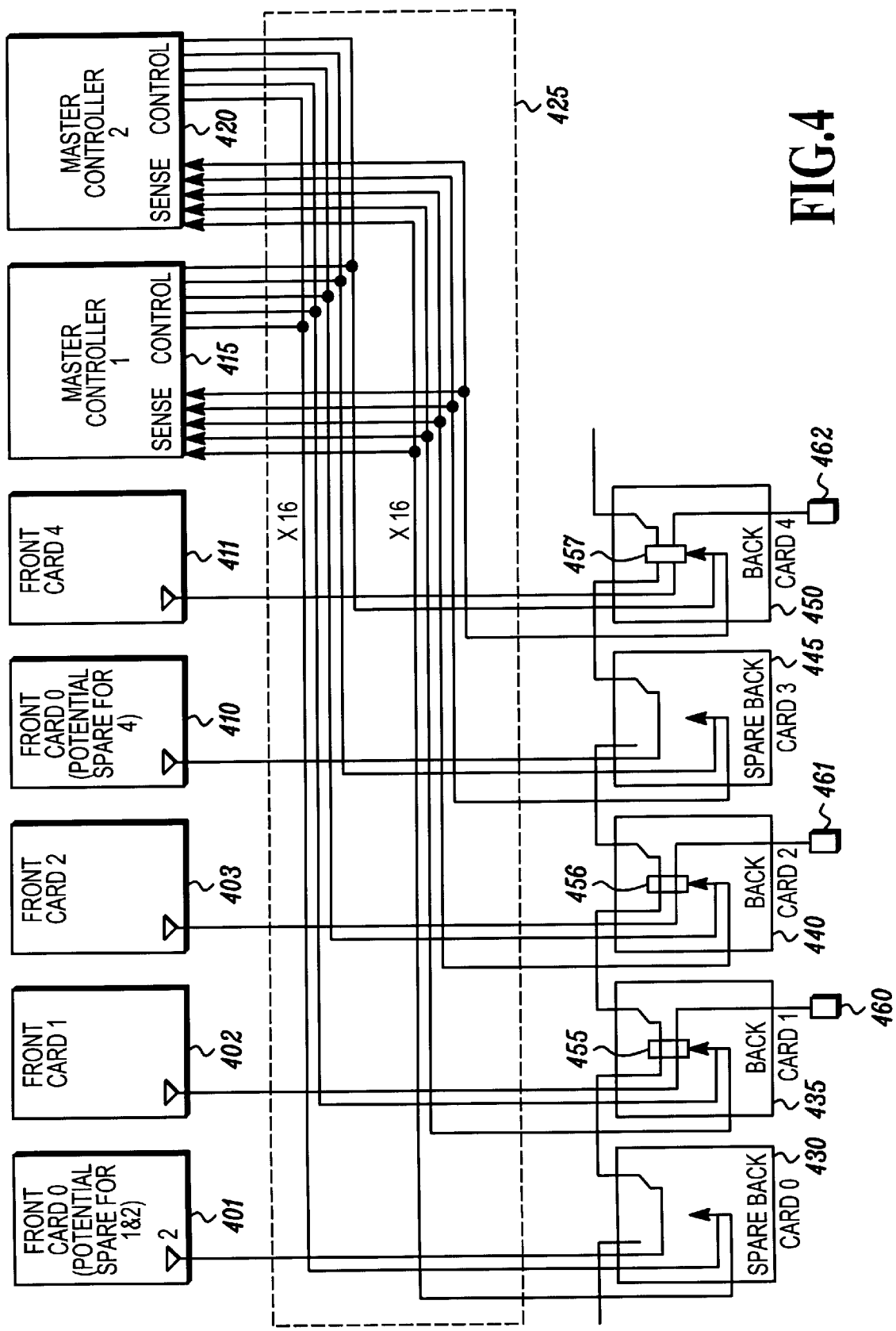
FIG. 4 shows a block diagram of an RF protection switch system of the present invention.

FIG. 4 illustrates a block diagram of a preferred embodiment of the RF protection switch system of the present invention. This figure illustrates the approximate layout in a circuit card cage of the various circuits that comprise the RF protection switch system.

The RF protection switch system is comprised of a plurality of active cable interface circuit cards (402, 403, and 411). Only three active circuit cards are shown for purposes of clarity. In the preferred embodiment, up to 16 active circuit cards may be used. Alternate embodiments use other quantities of active circuit cards.

In addition to the active cable interface circuit cards, a number of spare circuit cards (401 and 410) having substantially identical circuits to the active cable interface circuit cards are present. In the preferred embodiment, these spare circuit cards incorporate exactly the same circuitry. Alternate embodiments, however, may have additional circuits that provide minor changes to the functionality of the circuit card.

In the preferred embodiment, the spares are not used during normal operation of the system. As will be explained subsequently, the spares are switched into the path of the incoming (upstream) RF signal from the customer cable modem when an active circuit card fails and the spares are also switched into the path of the departing (downstream) RF signal to the customer cable modem when an active circuit card fails.

In the embodiment of FIG. 4, a spare cable interface circuit card (401) is assigned to back-up two active circuit cards (402 and 403). The second spare cable interface circuit card (410) is assigned to back-up the remaining active circuit card (411). Alternate embodiments assign the spare circuit cards to different active cards and also different quantities of active circuit cards.

For purposes of clarity, only two spare cable interface circuit cards are illustrated. In the preferred embodiment, there is one spare cable interface circuit card for the first two active circuit cards and another spare cable interface card for the third active circuit card. Alternate embodiments use other numbers of spares to active circuit cards.

Both the active and the spare cable interface circuit cards (402, 403, 411, and 401, 410) are connected to a mid-plane circuit board (425). The mid-plane (425) is comprised of a circuit card connector for each circuit card. Additionally, each circuit card connector is coupled to the other connectors via traces on the mid-plane (425). The mid-plane (425) and its card connectors are well known in the art and will not be discussed further.

Each cable interface circuit card has a respective RF switching card (430, 435, 440, 445, and 450). Even the spare cable interface circuit cards (401 and 410) are paired with an RF switching card (430 and 445 respectively). The RF switching cards (430, 435, 440, 445, and 450) are also inserted into circuit card connectors on the mid-plane (425).

Each RF switching card (435, 440, and 450) that is paired with an active cable interface circuit card (402, 403, and 411 respectively) is comprised of a set of F-type connectors (460–462) that interfaces the switching card to the cable that eventually runs to the customer's cable modem.

In the preferred embodiment, the RF switching cards are comprised of 2×2 switches (455–457) that perform the switching. The RF switching cards (430, 435, 440, 445, and 450) are daisy-chained together through the 2×2 switches (455–457).

Two of the switching cards (430 and 445) do not use switches. These switching cards (430 and 445) are paired with the spare cable interface circuit cards (401 and 410 respectively) and function only to continue the propagation of signals within the daisy chain of switches (455–457).

Additionally, in the preferred embodiment, the switching cards (430 and 445) without the 2×2 switches do not have F-type connectors to output or receive an RF signal to/from home cable modems since these switching cards are paired with spare cable interface circuit cards.

In the preferred embodiment, the switches (455–457) on the switch cards (435, 440, and 450) are solid-state relays. Alternate embodiments use other types of switches such as discrete transistors, mechanical relays, or any other type of switch that can perform substantially the same function.

The preferred embodiment of the construction of the 2×2 switches is illustrated in FIG. 5. The pole (502) of the first switch (501) is coupled to the left daisy-chain trace in the midplane that ultimately connects to the RF signal on the switch card (430 or 445) that is associated with one of the spare cable interface circuit cards.

The connection to the spare associated switch card (430 or 445) may be a direct connection, as illustrated in FIG. 4, with two of the switch cards (435 and 450). The connection to the spare (430 or 445) may also be a daisy chain connection through the 2×2 switches on the other switch cards (435 and 440).

The first throw (504) of the first switch (501) is coupled to the right daisy chain as illustrated above. The second throw (510) of the first switch (501) is coupled to the first throw (511) of the second switch (505).

The pole (512) of the second switch (505) is coupled to the F-type connector on the switch card. This F-type connector can support either inputs or outputs. The second throw (513) of the second switch (505) is coupled to the input or output of its paired active cable interface circuit card.

Referring again to FIG. 4, two master controller cards (415 and 420) are present to control the operation of the RF switch cards (430, 435, 440, 445, and 450). A first master controller is active (415) while the second master controller (420) is a back-up controller in case the first controller fails. Both master controller cards (415 and 420) are operating simultaneously, however, only one is actively coupled to the switch cards at any time.

Each master controller (415 and 420) also has a control signal line going to each of the RF switch cards (430, 435, 440, 445, and 450). Each control signal line transmits a control signal from the active master controller (415 or 420) to one of the 2×2 switches in the case of a failed cable interface circuit card.

The master controllers also have signal sense lines coming from each of the 2×2 switches on each of the RF switch cards. The sense lines indicate whether a master controller's control signal is being received at the RF switch card. If incorrect signals are being received from the RF switch card, that RF switch card is considered failed and must be replaced since correct operation of the RF switch card is not guaranteed.

Both the first and second master controllers are coupled to the mid-plane bus through input/output buffers that have a high-impedance state. Both master controllers are performing, either continuously or periodically, a self-test routine to determine their state. If the active master controller fails, the second master controller can take over operation of the system.

Once the active master controller fails, the input/output buffers are put in the high impedance state to remove it from the bus. This prevents the failed controller from interfering with the back-up active controller while it is operating.

FIG. 6 illustrates a block diagram of a preferred embodiment of the master controllers of the present invention. Each master controller is comprised of the input buffers (601) coupled to the input sense lines from the switch cards. As described above these buffers have a high impedance mode.

The input buffers are coupled to a sense block (603) that monitors the sense lines from the switch cards and determines when a switch card is no longer receiving a control signal. The lack of a control signal indicates that a switch card has failed and should be replaced.

The sense block (603) transmits the location or number of the appropriate switch card to control logic (604). The control logic uses the information from the sense block (603) to generate and transmit a switch card repair message to an operations management terminal.

The control logic (604) also receives packet loss rate information and power level information from each of the cable interface cards and can use this information to determine when a cable interface card should be switched out of the path of the user data.

To initiate this switch, the switch control signals are output through output buffers (602) that also have high impedance capability. Both the input and the output buffer's (601 and 602) control inputs are coupled to a self-test block (610) that determines when the master controller has failed and the high impedance state of each buffer is required. The self-test block (610) then outputs the control signal that places the input and output buffers (601 and 602) into their high impedance states.

Figure 7:
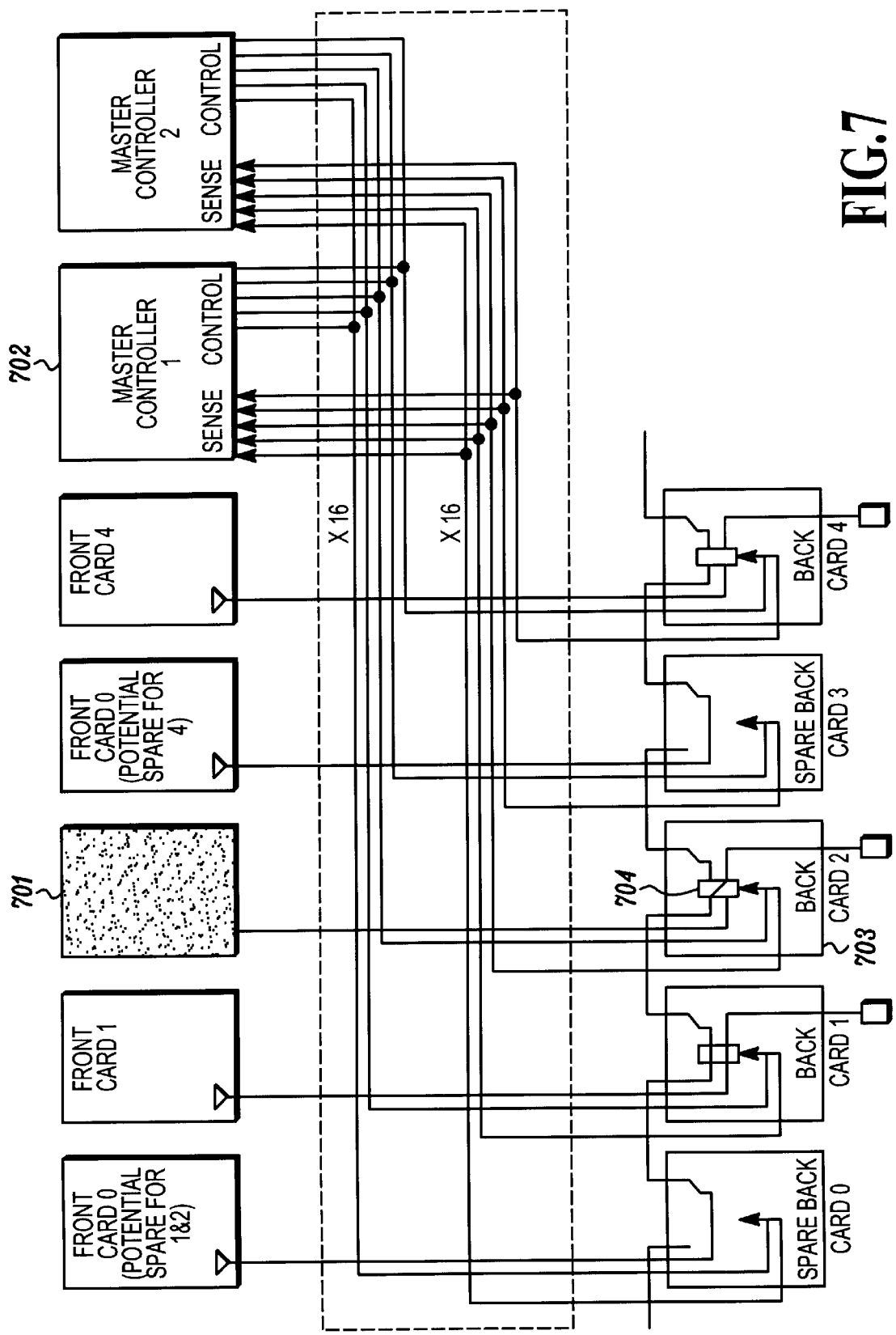
FIG. 7 shows a block diagram of an RF protection switch system having a failed cable interface circuit card.

FIG. 7 illustrates the RF protection switch system of FIG. 4 with a failed cable interface circuit card (701). The active master controller (702) has detected a failure in the active cable interface card (701) and has instructed the paired switch card (703) to throw its 2×2 switch (704).

The orientation of the switch (704) of the switch card (703) that is paired with the failed cable interface circuit card (701) is illustrated in FIG. 8. This figure illustrates how the poles of the switch (704) now direct the signal between the F-type connector and the left daisy-chain towards the spare cable interface circuit card (710).

FIG. 8 shows that the pole (803) of the first switch (801) is now down to connect it with the throw (806) that goes to the second switch (802). The pole (804) of the second switch (802) is now connecting the F-type connector (805) to the first throw (807) of that switch (802).

Figure 9:
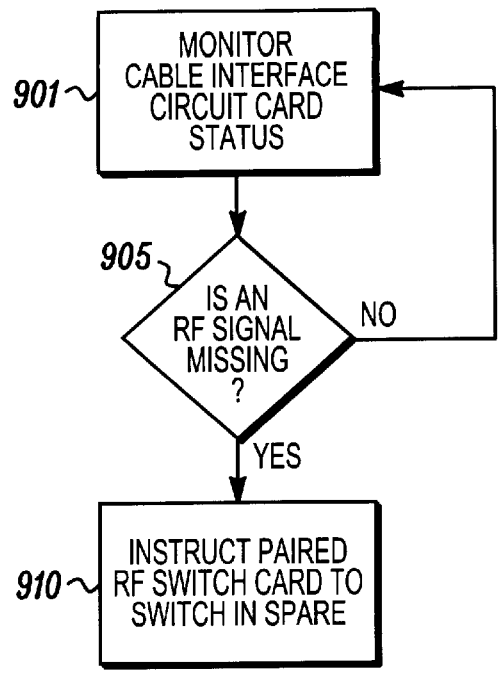
FIG. 9 shows a flowchart of a fault detection and switching process of the present invention.

FIG. 9 illustrates a flowchart of the switching process of the present invention. The process begins by monitoring the packet loss rate or power level for each of the cable interface cards (step 901). If the packet loss rate is lower than a pre-configured threshold and the power levels are higher than a pre-configured threshold, the master controllers continue to monitor (step 905).

If an the packet loss rate is higher than a pre-configured threshold or the power levels are lower than a pre-configured threshold (step 905), the cable interface circuit card coupled to that particular RF switching card is considered failed and must be switched out of the circuit (step 910). In this case, the master controller sends a signal to the RF switch card that is paired with the failed cable interface circuit card to switch the 2×2 switch over (as described above) such that the spare cable interface circuit card is now outputting and receiving signals in place of the failed card.

Figure 10:
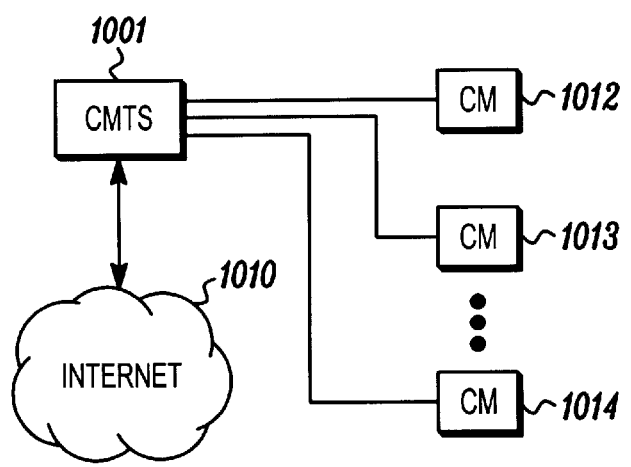
FIG. 10 shows a block diagram of a system incorporating the cable modem apparatus of the present invention.

FIG. 10 illustrates a cable system block diagram incorporating the RF switch protection system of the present invention. This system is comprised of the CMTS (1001) that is coupled to the Internet (1010). The CMTS is located at the cable company headquarters.

The CMTS is coupled to a larger number of CMs (1012–1014). For purposes of clarity, only three CMs are shown. However, as described above, the CMTS may communicate with thousands of CMs, depending on how the cable company set up the system.

The preferred embodiment of the present invention is in a cable modem environment in which each of the cable interface circuit cards is identical. Alternate embodiments can use this invention in any environment having circuitry or circuit cards that can be switched out as provided herein. Such embodiments can include computer and telecommunication systems. Additionally, alternate embodiments use separate circuitry that is not identical to the other circuitry providing the spare circuitry or circuit cards can substitute for the failed circuitry or circuit cards.

In yet another alternate embodiment, the signal used by the master controller to determine the state of the cable interface circuit cards is a digital control signal other than the packet loss rate information or the power level information signal generated by the cable interface circuitry. Such a digital signal includes a self-test result signal generated by self-test circuitry on the cable interface circuit card.

In summary, the process and system of the present invention provide a fast and economical means for switching out failed active circuit cards. By providing a paired switch card for each cable interface circuit card and a controller for controlling the state of the switch card, a failed cable interface circuit card can be switched out and a spare circuit card switched in with minimal data/video loss to the customer.

We claim:

1. A cable modem termination system for providing spare circuit availability to active cable modem circuits, the system comprising:

a plurality of active circuit cards comprising cable modem signal processing circuitry having an output signal;

a spare circuit card comprising circuitry that is substantially similar to a first active circuit card of the plurality of active circuit cards, the spare circuit card comprising a spare output signal;

a plurality of switch cards, each switch card coupled to one of a corresponding active circuit card or the spare circuit card, each switch card that is coupled to its corresponding active circuit card comprising an input/output connection and a switch having a switch control input, each switch card coupled to a previous and a subsequent switch card; and a first controller circuit card coupled to the plurality of active circuit cards, the spare circuit card, and the plurality of switch cards, the first controller circuit card having a plurality of switch control outputs, each switch control output coupled to a switch control input of each of the plurality of switches, the first controller circuit card generating, in response to a failed first active circuit card, a switch control signal that activates the switch on the switch card corresponding to the first active circuit card such that the spare output signal is routed through its corresponding switch card and any intervening switch cards to the input/output connection of the switch card corresponding to the first active circuit card.

2. The cable modem termination system of claim 1 wherein a switch card, of the plurality of switch cards, corresponding with the spare circuit card comprises a circuit that couples the output signal from the spare circuit card to a subsequent switch card.

3. The cable modem termination system of claim 1 and further including a second controller circuit card comprising substantially similar circuitry to the first controller circuit card, the second controller circuit card coupled to the plurality of active circuit cards, the spare circuit card, and the plurality of switches such that the second controller circuit card operates in parallel with the first controller circuit card.

4. The cable modem termination system of claim 1 wherein each switch comprises a 2×2 switch.

5. The cable modem termination system of claim 1 wherein the output signal and the spare output signal are radio frequency signals.

6. The cable modem termination system of claim 3 wherein the first and second controller circuit cards generate the switch control signal in response to a failed output signal from the first active circuit card.

7. The cable modem termination system of claim 1 and further including a plurality of spare circuit cards, each spare circuit card coupled to a corresponding switch card of the plurality of switch cards.

8. A method for providing spare circuit card availability to a plurality of active circuit cards in a system having a system controller, each active circuit card being coupled to a corresponding switch card of a plurality of switch cards, the plurality of switch cards being daisy-chained together such that an output signal of a previous switch card is coupled to an input signal of a subsequent switch card, each switch card comprising an input/output connection, the method comprising:

each active circuit card generating an output signal indicating a condition of the active circuit card;

the system controller monitoring the output signal for an indication of failure of a first active circuit card; and if the output signal indicates failure of the first active circuit card, the system controller generating a switch signal to the switch card corresponding to the first active circuit card such that an output signal from the spare circuit card is routed through the spare circuit card's corresponding switch card, and any intervening switch cards daisy-chained to the spare circuit card's corresponding switch card, to the input/output connection of the first active circuit's corresponding switch card.

* * * * *